United States Patent [19]

Peters

[11] 4,441,654
[45] Apr. 10, 1984

[54] FUEL INJECTOR ASSEMBLY INCLUDING A BLOW-BACK PREVENTION CAM

[75] Inventor: Lester L. Peters, Columbus, Ind.

[73] Assignee: Cummins Engine Company, Inc., Columbus, Ind.

[21] Appl. No.: 336,334

[22] Filed: Dec. 31, 1981

[51] Int. Cl.³ .......................................... F02M 47/02
[52] U.S. Cl. ..................................................... 239/89
[58] Field of Search ....................... 239/88, 89, 90, 91; 123/387, 179 L, 502

[56] References Cited

U.S. PATENT DOCUMENTS

| | | | |
|---|---|---|---|
| 2,984,231 | 5/1961 | Cummins | 239/90 |
| 3,351,288 | 11/1967 | Perr | 239/89 |
| 3,355,108 | 11/1967 | Cummins | 239/89 |
| 3,412,717 | 11/1968 | Carey et al. | 239/88 |
| 3,544,008 | 12/1970 | Reiners et al. | 239/89 |
| 3,557,765 | 1/1971 | Nystrom | 123/387 |

Primary Examiner—John J. Love
Assistant Examiner—Gene A. Church
Attorney, Agent, or Firm—Sixbey, Friedman & Leedam

[57] ABSTRACT

A unit injector assembly (2, 40) of the cam actuated, open nozzle type is disclosed in which an extremely compact injector body is actuated by a cam lobe (42) having a stepped profile for causing fuel to be metered into an injection chamber (52) of the injector (2) without blow back of gas into the supply passage (66) feeding fuel to the injector. The invention is characterized by an injector body (4) having a minimum number of internal flow passages (66, 72) designed to reduce the complexity and cost of manufacture of the injector and having an exterior shape designed to form a fuel supply flow path (22) and an isolated fuel drain flow path (24) between the exterior surface of the injector body (4) and the interior surface of the recess (6) in which the injector (2) is designed to be received.

11 Claims, 10 Drawing Figures

FUEL INJECTOR ASSEMBLY INCLUDING A BLOW-BACK PREVENTION CAM

DESCRIPTION

1. Technical Field

This invention relates to a low cost, miniaturized unit fuel injector assembly of the type including an open nozzle injector and cam operated injector plunger.

2. Background Art

Internal combustion engine designers have increasingly come to realize that substantially improved fuel supply systems are required in order to obtain higher levels of pollution abatement and increased fuel economy. Among the known options, direct fuel injection appears to be one of the best candidates for achieving improved performance but higher initial costs have tended to discourage its general adoption. This situation is accentuated by the fact that only the more sophisticated, and therefore normally the more expensive, direct injection systems are capable of achieving the increasingly higher performance goals of engine manufacturers.

Up to the present, attempts to provide a low cost fuel injection system have tended to center on distributor type fuel injection systems having a single centralized high pressure pump and a distributor valve for metering and timing fuel flow from the pump to each of a plurality of injection nozzles, such as disclosed in U.S. Pat. No. 3,557,765. Although simple in design concept, systems of this type generally suffer defects inherent with separation of the injector nozzles from the centralized pump. Unit injector systems avoid the inherent defects of distributor type systems by providing each engine cylinder with its own cam-actuated pump such as disclosed in U.S. Pat. No. 3,544,008. Nevertheless, the performance advantage of unit injectors have generally not outweighed the detriment of greater costs except for heavy duty compression ignition engine applications.

While unit injectors have not normally been employed in low cost fuel systems, numerous refinements have been proposed over the years in an attempt to lessen their cost while retaining their inherent advantages. For example, the assignee of this application, Cummins Engine Company, Inc., has developed an open nozzle, pressure/time unit injector (see U.S. Pat. Nos. 3,351,288 and 3,544,008) which is characterized by the need for only a single supply line (common rail) for supplying fuel to all of the injectors. Because fuel is metered into each injector through a separate feed orifice, the time during which each feed orifice is open and the pressure within the common rail can be relied upon to control the quantity of fuel metered for injection during each injection cycle. Additional cost reductions are realized because an open nozzle unit injector does not require a pressure relief valve at the injection orifice.

While effective in providing cost reductions, certain precautions are usually required in pressure/time, open nozzle injector systems to insure that combustion gases and spurious pressure signals do not enter the fuel supply system. These precautions may include the use of a check valve such as illustrated in U.S. Pat. Nos. 3,355,108 and 2,984,231, upstream from the feed orifice of the injector to discourage combustion gases (known as blow-back) from entering the fuel supply. It is also common to provide for scavenging flow of fuel through the injector to remove gases which may have entered the fuel supply line. Scavenging flow additionally serves the function of cooling the injector and would be useful even if it were unnecessary to remove blow-back gases. Thus, a commercially acceptable unit injector, even when designed in accordance with principles intended to simplify the injector structure, is typically a labyrinth of axial and radial drillings. As used in this application, "axial" means parallel with the longitudinal axis of the injector and "radial" means perpendicular to the longitudinal axis of the injector. Moreover, the injector body is usually formed of multiple components requiring very close tolerance controls.

Still other attempts have been made to control blow-back gases in open nozzle unit injectors by employing a stepped cam for closing off a fuel feed port in the injector prior to a build up of compression pressure within the combustion chamber served by the injector. See, for example, FIG. 9 and col. 5, lines 49-71 of U.S. Pat. No. 2,984,231. Implementation of such blow-back control concepts as disclosed in U.S. Pat. No. 2,984,231 require axial passages in both the injector body and in the cam actuated plunger mounted within the injector body. The need for such passages can add significantly to the cost and complexity of an injector.

In very simple cam actuated injectors, such as illustrated in Australian Pat. No. 202,734, axial drillings have been eliminated from the injector body by forming a flow path between the exterior of the injector body and the interior of the recess in which the injector body is received. By this arrangement, an easily formed radial bore may be provided in the injector body to act as a feed passage from the supply flow path surrounding the injector body into the injection chamber of the unit injector. If the injector is capable of providing a scavenging fuel flow as illustrated in U.S. Pat. No. 3,351,288 or 2,984,231, the number of necessary flow passages increases and the overall size of the injector must increase to accommodate such passages. Multi-function injectors of this type normally require at least one or more axial passages. Such passages are more difficult and costly to form and have not been eliminated even in injector designs in which the supply and drain lines leading to and from the injector are formed entirely within the engine head such as is illustrated in U.S. Pat. No. 3,351,288.

In short, fuel injectors capable of meeting rigorous operating specifications have invariably been highly complex, costly to manufacture, and/or relatively large in size.

DISCLOSURE OF THE INVENTION

The first object of this invention is to overcome the deficiencies of the prior art described above by providing a fuel injector assembly of greatly simplified design but which is capable of performing a variety of functions, including blow-back gas control, previously associated only with more complex designs.

The second object of the subject invention is to provide a stepped cam structure for actuating a simplified unit injector designed to cooperate with the stepped cam in a manner to cause an early termination of injector metering prior to the desired time for fuel injection to prevent thereby back flow gases from entering the fuel supply line while at the same time eliminating the need for a check valve upstream from the feed orifice of the injector.

The third object of this invention is to provide a highly compact, unit injector assembly capable of controlling blow-back gases including an injector body having a minimal number of fluid flow passages, most of which are arranged in a generally radial direction to decrease manufacturing costs.

The fourth object of this invention is to provide a unit injector capable of controlling blow-back gases in which the injector includes individual components and passages are shaped and organized to perform multiple functions previously requiring a significantly greater number of injector components. In particular, a radially directed supply passage containing a feed orifice for metering fuel into the injector may also serve to supply fuel to the injector for scavenging and cooling purposes.

Still other and more specific objects of this invention may be understood from an examination of the following Brief Description of the Drawings and Best Mode for Carrying Out the Invention.

BEST MODE FOR CARRYING OUT THE INVENTION

Throughout this application, the word "inward" and "outward" will correspond to the directions, respectively, toward and away from the point at which fuel from an injector is actually injected into the combustion chamber of an engine. To further aid in an understanding of this invention, an index of the elements identified by reference numerals in the drawings is listed at the end of this description of the Best Mode for Carrying Out the Invention.

Figure 1:
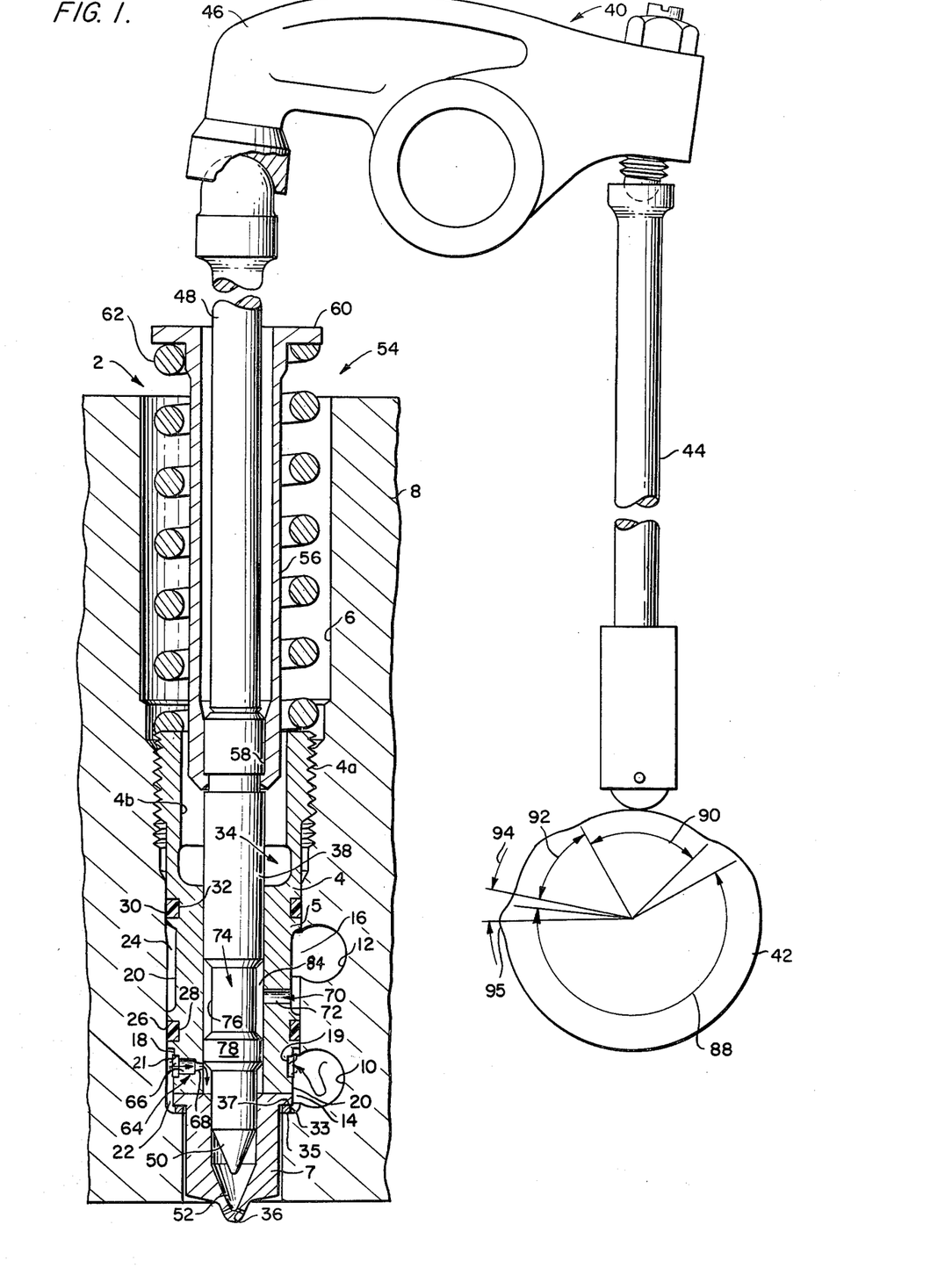
FIG. 1 is a partially broken away cross-sectional view of one embodiment of the subject invention employing a greatly simplified arrangement of fuel supply and drainage passages.

FIG. 1 illustrates an open nozzle, pressure/time unit injector designed in accordance with the subject invention. In particular, FIG. 1 shows a unit injector 2 including an injector body 4 received in a recess 6 contained in the head 8 (only partially illustrated) of an internal combustion engine. Injector body 4 is actually formed in two sections including an upper section or barrel 5 and lower section or cup 7 which is integrally joined to barrel 5. As is apparent from FIG. 1, injector body 4 is held within the recess 6 by means of mating screw threads 4a and may be placed in position by means of a torque applying wrench adapted to mate with a hexagonal socket 4b contained in the upper end of the injector body 4.

Fuel supply and drainage is provided for the injector through passages contained entirely within head 8. In particular, a supply channel 10 (sometimes referred to as a common rail) is adapted to supply fuel to the unit injector 2 while a drain channel 12 is adapted to receive fuel discharged from the injector for return to the fuel supply system. Both channel 10 and channel 12 may be formed to communicate with each of a plurality of injector receiving recesses positioned within head 8 to eliminate all external flow passages to and from the injectors. As illustrated in FIG. 1, the intersection of channel 10 with recess 6 defines a supply port 14. Similarly, the intersection of channel 12 and recess 6 defines a drain port 16.

The exterior surface of the injector body 4 is shaped to provide first and second annular recesses 18 and 20 axially spaced to communicate with channels 10 and 12 through supply port 14 and drain port 16, respectively. By this arrangement, a supply flow path 22 is formed between supply port 14 and the exterior surface of the injector body 4 defining first annular recess 18. Similarly, a drain flow path 24 is formed between drain port 16 and the exterior surface of the injector body 4 which defines second annular recess 20. In order to isolate flow paths 22 and 24, a circumferential seal 26 is positioned between the injector body 2 and the interior surface of recess 6. As is apparent from FIG. 1, the circumferential seal 26 may be positioned within a first annular groove 28 located between annular recesses 18 and 20. A similar type of circumferential seal 30 is positioned within a second annular groove 32 located above the drain flow path 24 to insure against fuel leakage. The inner end of supply flow path 22 is sealed by means of a washer-like seal element 33 compressibly held between an radially directed lip 35 formed in recess 6 and an radially directed surface 37 formed on injector body 4. To prevent particles from entering the injector body 4, first annular recess 18 may contain an annular undercut 19 covered by a filter screen 21 through which fuel entering the injector body 4 must pass.

Injector body 4 contains a central bore 34 which is coaxial with the longitudinal axis of the injector body 4. At the inner (lower) end of the injector body 4, one or more small injection orifices 36 are contained to provide a communication path between central bore 34 and a combustion chamber (not illustrated). Fuel is supplied to the combustion chamber through injection orifices 36 in controlled synchronism with the operation of the corresponding cylinder piston (not illustrated). Positioned within central bore 34 is an injector plunger 38 adapted to reciprocate in response to a cam actuated mechanism 40 including a specially profiled cam lobe 42 connected to the conventional cam shaft (not illustrated) of the engine. Cam actuated mechanism 40 further includes a push rod 44, rocker arm 46 and a link 48. Because cam lobe 42 is rotated in a fixed manner relative to the reciprocating motion of the cylinder piston, injector plunger 38 may have its reciprocating motion very precisely controlled with respect to movement of the cylinder piston by carefully shaping the profile of cam lobe 42. Essentially, injector plunger 38 reciprocates between an innermost position (FIG. 2) in which injection orifices 36 are closed by the inner end 50 of plunger 38 and an outermost position (FIG. 1) in which an injection chamber 52 is formed within central bore 34 between the inner end 50 of injector plunger 38 and the injection orifices 36. Since this invention relates to injectors of the "open nozzle" type, injection orifices 36 remain open to the combustion chamber whenever injector plunger 38 is moved outwardly from its innermost position. Injectors of this type have an inherent cost advantage over more complex closed nozzle injectors which employ a pressure released tip valve for maintaining the injection orifice in a closed condition except during the injection event. Injector plunger 38 is permanently biased toward its innermost position illustrated in FIG. 1 by a plunger return means 54 including a sleeve-like coupler 56 connected at its lower end 58 to the upper end of injector plunger 38. A radially, outwardly directed flange 60 is positioned adjacent the topmost portion of coupler 56. A fairly high pressure compression spring 62 extends between the upper end of injector body 4 and flange 60 to continually bias injector plunger 38 outwardly.

To control the amount of fuel injected during each inward movement of injector plunger 38, unit injector 2 is provided with a "pressure/time" injection capability in which fuel is metered into the injection chamber before each injection stroke through a fill or feed orifice which has been carefully dimensioned to allow the amount of fuel injected to be varied within a given amount of time by varying the supply line (common rail) pressure. Thus, the amount of fuel actually metered is a function of the supply pressure and the total metering time during which fuel flows through the feed orifice. This principle is applied to unit injector 2 by provision of a supply connecting means 64 for providing a pathway for fuel under pressure to flow from the supply flow path 22 into the portion of the central bore 34 which forms injection chamber 52. The supply connecting means 64 includes a supply passage 66 extending from the exterior surface of the injector body 4 to the interior surface of the central bore 34 along a straight radial path perpendicular to the longitudinal axis of the injector body 4. A restricted portion of supply passage 66 forms a feed orifice 68 which has carefully controlled hydraulic characteristics in order to produce the desired pressure/time metering capability discussed above.

Drain connecting means 70 is formed in the injector body 4 to provide a pathway for fuel to flow from the central bore 34 into the drain flow path 24. In a manner similar to the formation of supply passage 66, the drain connecting means 70 is produced by forming a drain passage 72 extending from the exterior surface of the injector body to the interior surface of central bore 34 along a straight radial path perpendicular to the longitudinal axis of the injector body 4. Radial passages are significantly less expensive to manufacture as compared with axially arranged passages. Thus, the injector design of FIG. 1 achieves significant cost savings by employing the arrangement of flow paths and passages illustrated in FIG. 1.

To achieve the desired injector operation, injector plunger 38 has an exterior cylindrical surface which sealingly contacts the interior surface of central bore 34 to form an injection chamber seal. Injector plunger 38 includes a flow control means 74 for forming a scavenge flow path 84 in which fuel flows through the injector to scavenge blow back gases whenever the injector plunger 38 is less than a first predetermined axial distance from its innermost position. Flow control means 74 also allows fuel to be metered into the injector chamber 52 from the supply passage 66 only when the injector plunger 38 is moved outwardly more than a second predetermined distance from the innermost position.

Figure 2:
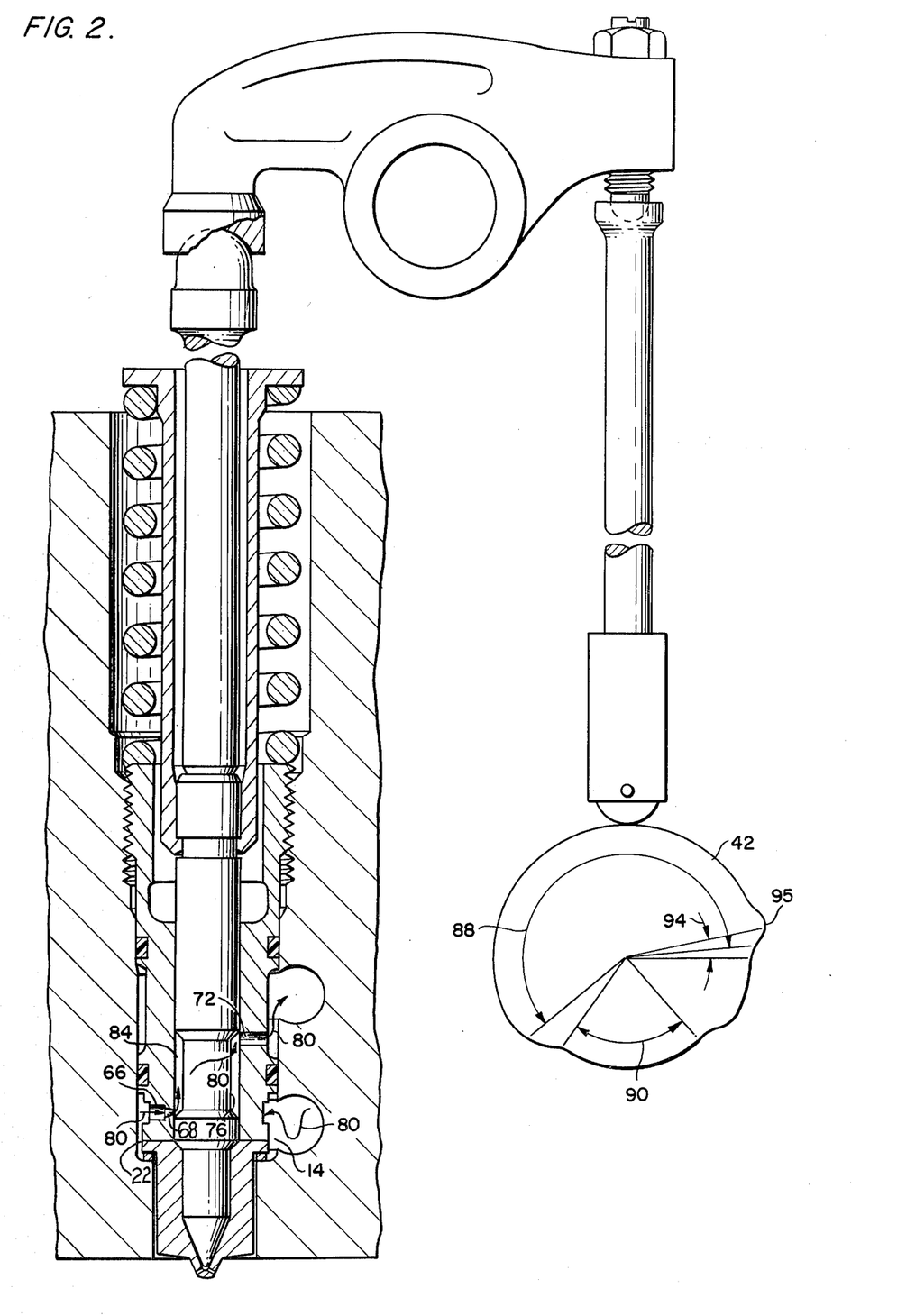
FIG. 2 is a partially broken away cross-sectional view of the unit injector illustrated in FIG. 1 in which the injector plunger has been moved by a cam actuation means to an outermost position.

Flow control means 74 includes an annular groove 76 on the exterior surface of the injector plunger 38 extending axially from the supply passage 66 to the drain passage 72 when the injector plunger 38 is at is innermost position as illustrated in FIG. 2. Flow control means 74 further includes a cylindrical land 78 formed below or inwardly of groove 76 to cooperate with the interior surface of the central bore 34 to form a seal between the scavenge flow path 84 and the inwardly located injection chamber 52. Thus, cylindrical land 78 is the innermost portion of the exterior cylindrical surface of injector plunger 38 which is in direct contact with the interior surface of central bore 34.

Injector plunger 38 is positioned at the first predetermined distance from its innermost position when the upper (outer) edge of cylindrical land 78 is located slightly inwardly from the upper (outer) edge of feed orifice 68. In this position, fuel may begin to flow into the scavenge flow path 84 formed by annular groove 76. Injector plunger 38 is positioned at the second predetermined distance when the lower (inner) edge of cylindrical land 78 is located slightly outwardly of the lower (inner) edge of feed orifice 68 to allow fuel to begin to flow into injection chamber 52. Obviously, the first predetermined distance is less than the second predetermined distance by an amount approximately equal to the axial extent of the cylindrical land 78 plus the axial extent of opening of the feed orifice 68 into central bore 34.

The operation of the embodiment illustrated in FIG. 1 can now best be understood by also referring to FIG. 2 which discloses the same injector in which the injector plunger 38 has been moved to its innermost position. As illustrated by arrows 80 in FIG. 2, fuel enters through supply port 14 into the supply flow path 22 formed by annular groove 18 and then enters supply passage 66 for passage subsequently into scavenge flow passage 84 formed by groove 76 and is discharged through drain passage 72. The scavenging flow performs two very useful functions which are to cool the injector and to remove any combustion gases which may have entered through open injection orifices 36 into the fuel supply line. When the injector plunger 38 is moved outwardly sufficiently to open feed orifice 68, as illustrated in FIG. 1, fuel will flow into injection chamber 52 in an amount dependent upon the pressure in supply channel 10 and the length of time which feed orifice 68 remains open.

In the absence of any specialized timing control capability, the amount of time which the injector plunger 38 dwells in either the innermost or outermost position depends upon the profile of cam lobe 42. As is apparent from FIGS. 1 and 2, a preferred design for cam lobe 42 includes a first sector 88 comprising more than 180° of the total circumference of cam lobe 42. Sector 88 causes the injector plunger 38 to assume the innermost position. A second sector 90 of almost 90° causes the plunger to assume an outermost position as illustrated in FIG. 1. Separating first sector 88 and second sector 90 is a third sector 92 (FIG. 1), the function of which will be described in greater detail below. Essentially, sector 92 functions to move the injector plunger 38 to a supply passage blocking position in which the injector plunger 38 is moved inwardly sufficiently to close off feed orifice 68 but does not move the injector plunger 38 sufficiently to actually initiate fuel injection. Third sector 92 is shaped to cause feed orifice 68 to be closed during the time that combustion chamber pressures are rising to a sufficiently high level to cause significant back flow of combustion gases into the fuel supply line. A fourth small sector 94 of the cam lobe 42 represents approximately that portion of the cam lobe 42 which causes actual fuel injection. The actual point at which injection begins is approximate since it depends in part upon the amount of fuel metered into chamber 52 during each cycle.

Figure 3:
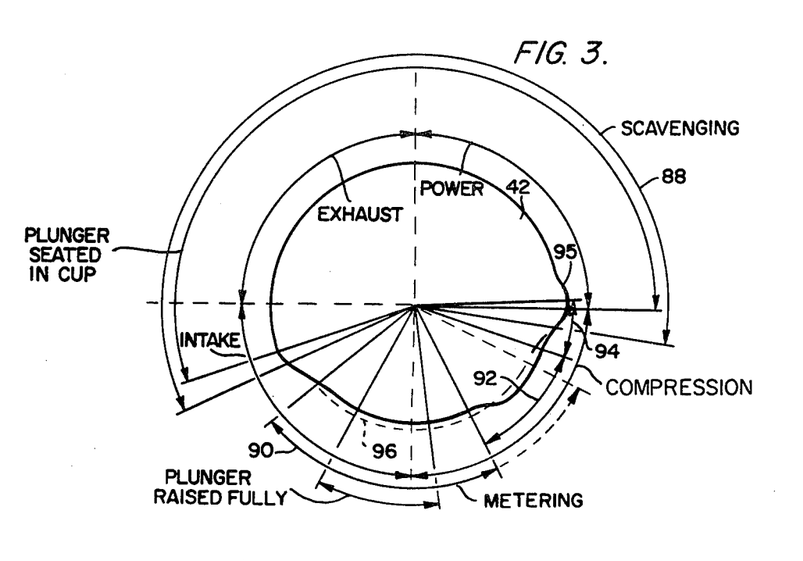
FIG. 3 is a diagrammatic illustration of a stepped cam having a profile which reduces combustion gas back flow in the unit injector of the subject invention.

Reference is now made to FIG. 3 wherein the relationship of the profile of cam lobe 42 to the conventional four cycle stroke movements of the associated engine piston is illustrated. In particular, first sector 88 engages the lower end of push rod 44 (FIGS. 1 and 2) at the point just before the engine piston executes its power stroke and continues to engage rod 44 throughout the exhaust stroke and a portion of the intake stroke of the piston. Second sector 90 engages rod 44 approximately halfway through the intake stroke of the piston and ceases to engage rod 44 approximately halfway into the compression stroke. Second sector 90 defines the time during each injector cycle when fuel is metered into the injection chamber 52. Third sector 92 which causes the injector plunger 38 to move toward its innermost position sufficiently to close the feed orifice 68 but not to cause injection is positioned to engage push rod 44 approximately halfway through the compression stroke and to continue this engagement up to the point at which injection commences. The fourth small sector 94 is that portion of cam lobe 42 which causes injector plunger 38 to its innermost position to force the metered fuel in injection chamber 52 through injection orifices 36 into the combustion chamber of the engine. A slightly raised dimple 95 (exaggerated in FIGS. 1 and 2) is formed on cam lobe 42 near the end of fourth sector 94 to place a "crush load" on injector plunger 38 at the end of the injection event in order to hold the injector plunger 38 tightly against the injector cup 7. This ability to hold injector plunger 38 very tightly against the injector cup 7 insures that injection orifices 36 will be sharply closed and will remain closed at the end of each injection period.

The dashed line 96 in FIG. 3 represents a more conventional cam profile in which the injector plunger would not be moved outwardly quite as far during the metering phase of operation. Moreover, the metering phase is shown as continuing throughout a much greater portion of the compression stroke of the engine piston. Because the metering phase has been reduced in the subject invention, it is necessary to enlarge the feed orifice 68 to accommodate a somewhat higher rate of fuel flow into the injection chamber during the shortened metering period. Tests have shown that the combination of a stepped cam profile and shortened metering period in combination with the scavenging flow is fully adequate to prevent blow back gases from interfering with satisfactory operation of the injector plunger 38 illustrated in FIGS. 1 and 2 without the use of a conventional check valve upstream from the feed orifice 68.

FIGS. 4, 5a–5e and 6 illustrate even more clearly the various phases of injector operation as compared with valve motion and cylinder pressure. In particular, FIG. 4 specifically illustrates the movement of an exhaust valve (line 98) and the movement of an intake valve (line 100) with the cylinder pressure (line 102) occurring during the four stroke movements of an engine piston.

Figure 4:
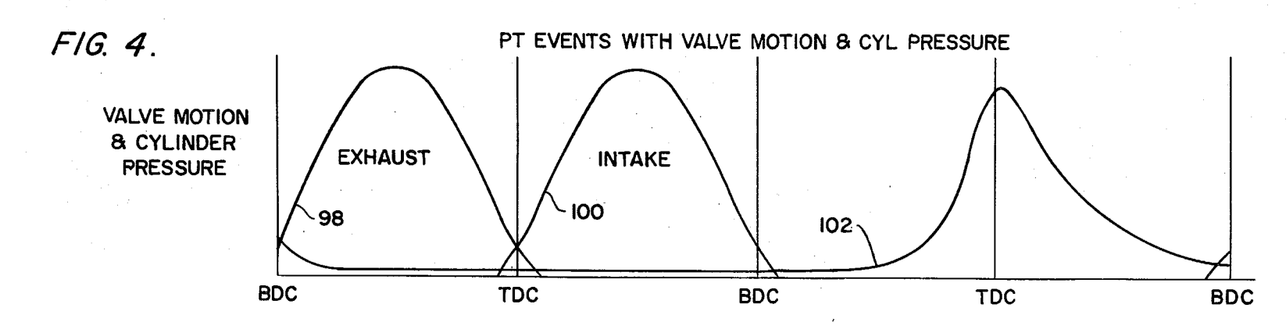
FIG. 4 is a chart showing valve motion and cylinder pressure within a typical internal combustion engine.
Figures 5A, 5B, 5C, 5D, 5E, 6:
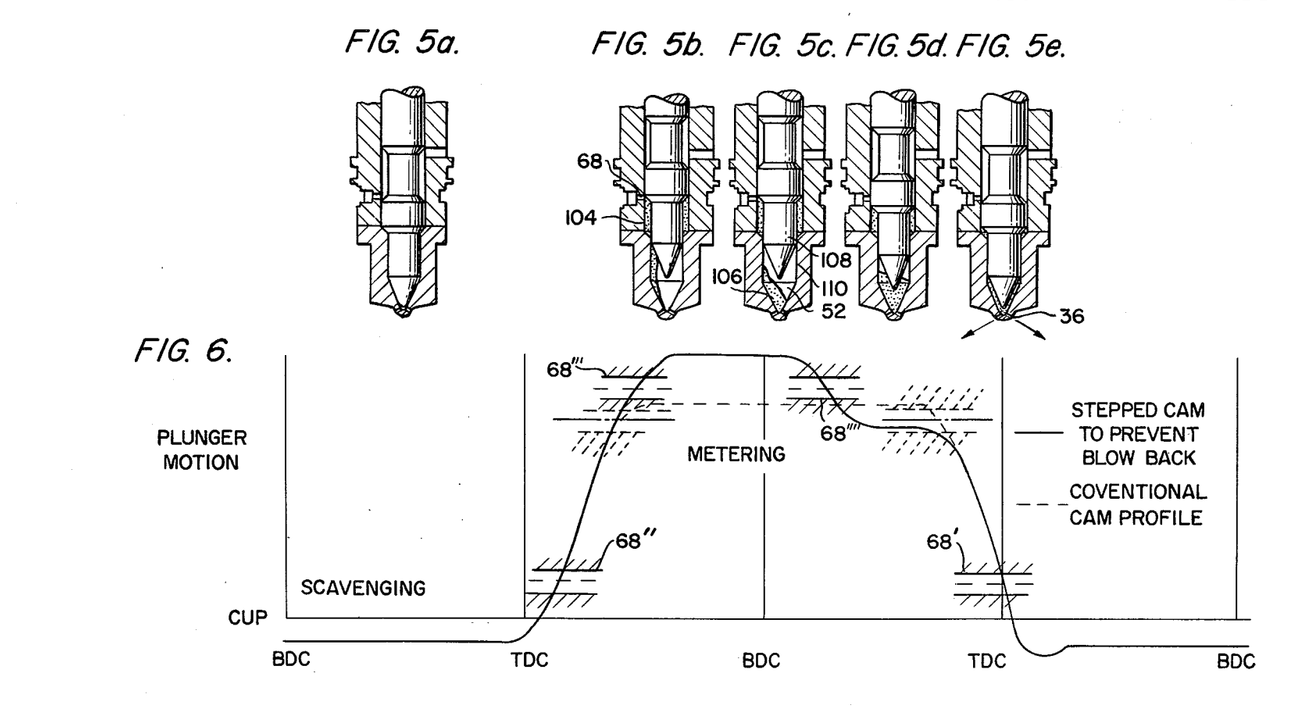
FIGS. 5a–5e illustrate various phases in the operation of a unit injector of the type illustrated in FIGS. 1 and 2.
FIG. 6 is a chart illustrating operation of the stepped cam of FIG. 3 as it is used to prevent combustion gas back flow.

FIGS. 5a–5e disclose the corresponding conditions of the injector plunger relative to the engine piston movement illustrated in FIG. 4. FIG. 5a thus shows the condition of an injector plunger during the exhaust stroke of a piston while FIG. 5b discloses the condition of the injector plunger upon initial opening of feed orifice 68 which thereby commences metering of fuel 104 into the injection chamber when the combustion chamber pressure is relatively low. FIG. 5c shows the condition of the injector toward the end of the metering period in which a greater quantity of fuel 106 has entered the injector chamber. It should be noted that a small clearance exists between the shank portion 108 of the innermost end of the injector plunger and the corresponding portion 110 of the central bore to allow fuel to flow from the upper portion to the lower portion of injection chamber 52.

FIG. 5d illustrates the condition of the injector when the third sector 92 of cam lobe 42 has caused the injector plunger to advance sufficiently to close feed orifice 68, but has not yet advanced the injector plunger sufficiently to force the metered fuel through the injector orifices 36. Thus, FIG. 5d illustrates the condition of the injector during the period that the cylinder pressure begins to increase substantially. Note that feed orifice 68 is closed to prevent combustion gas back flow. FIG. 5e shows the condition of the injector as the injector plunger is moved toward its innermost position to cause fuel injection through injection orifices 36.

FIG. 6 is a graph of injector plunger travel versus time. The corresponding top dead center (TDC) and bottom dead center (BDC) positions of the associated engine piston are also indicated in FIG. 6. The schematic illustrations of a feed orifice labeled 68' and 68" in FIG. 6 disclose the points along the solid line representative of injection plunger motion at which scavenging commences and ends, respectively. Similarly, the feed orifice illustrations labeled 68''' and 68'''' represent the commencement and termination of fuel metering at corresponding points along the solid line in FIG. 6 representative of injector plunger travel. The dashed line of FIG. 6 illustrates the injector plunger motion which would result if a more conventional cam lobe profile were employed rather than the profile illustrated in FIGS. 1–3. The feed orifice would also be repositioned as shown with the dashed lines.

An especially simple unit injector has been described which combines a simplified flow passage arrangement with a stepped cam profile to provide a multi-function, high performance injector which requires far fewer components than conventionally designed injectors.

INDEX TO REFERENCE NUMBERS 2 unit injector
4 injector body
4a screw threads
4b hexagonal socket
5 upper section or barrel
6 recess
7 lower section or cup
8 head
10 supply channel
12 drain channel
14 supply port
16 drain port
18 first annular recess
19 annular undercut
20 second annular recess
21 filter screen
22 supply flow path 24 drain flow path
26 circumferential seal
28 first annular groove
30 circumferential seal
32 second annular groove
33 washer-like seal element
34 central bore
35 lip
36 injection orifice
37 radially directed surface
38 injector plunger
40 cam actuated mechanism
42 cam lobe
44 push rod
46 rocker arm
48 link
50 forward end
52 injection chamber
54 plunger return means
56 coupler
58 lower end of coupler
60 flange
62 compression spring
64 supply connecting means
66 supply passage
68 feed orifice
70 drain connecting means
72 drain passage
74 flow control means
76 annular groove
78 cylindrical land
80 arrows
84 scavenge flow path
88 first sector
90 second sector
92 third sector
94 fourth sector
95 raised dimple
96 conventional cam profile
98 exhaust valve movement
100 intake valve movement
102 cylinder pressure
104 metered fuel
106 metered fuel
108 shank portion
110 central bore portion

INDUSTRIAL APPLICABILITY

A miniaturized unit injector designed in accordance with this invention would find application in a very large variety of internal combustion engines. One particularly important application would be for small compression ignition engines adapted for powering automobiles. Lighter truck engines and medium range horsepower engines could also benefit from the use of injectors designed in accordance with the subject invention.

I claim:

1. A fuel injector assembly for injecting periodically into a combustion chamber of an internal combustion engine fuel received from a fuel supply flow path, comprising:
   (a) an injector body containing
      (1) a central bore, and
      (2) an open injection orifice located to provide a communication path between the central bore and the combustion chamber;
   (b) supply connecting means for providing a pathway for fuel to flow from the supply flow path into the central bore, said supply connecting means containing a supply passage which communicates with the central bore through a feed orifice;
   (c) an injector plunger mounted for reciprocal movement within the central bore between an innermost position in which the injection orifice is closed by the inner end of said injector plunger and an outermost position in which an injection chamber is formed within the central bore between the inner end of said injector plunger and the injection orifice, said injector plunger including a cylindrical surface in direct sealing contact with the interior surface of the central bore to form an injection chamber seal; and
   (d) cam actuating means for reciprocating said injector plunger in timed sequence with the movement of a piston within the combustion chamber in a manner to cause fuel to be metered into the injection chamber without blow back of gas into the supply passage by moving said cylindrical surface outwardly beyond the feed orifice to cause the feed orifice to open directly into the injection chamber only when the combustion chamber pressure is relatively low and by terminating fuel metering substantially before fuel injection commences by moving said injector plunger inwardly to a supply passage blocking position in which said cylindrical surface is positioned over the feed orifice to seal the supply passage from the injection chamber during the period that combustion chamber pressure otherwise is increasing sufficiently to cause blow-back of gases into the supply passage if the supply passage were left unblocked.

2. A fuel injector assembly as defined in claim 1, in which said cam actuating means includes a cam lobe for controlling the position of said injector plunger, said cam lobe including a first sector having a radial extent for holding said injector plunger in its innermost position, a second sector having a radial extent for holding said injector plunger in its outermost position and a third sector having a radial extent intermediate the radial extents of said first and second sectors for moving said injector plunger to its supply passage blocking position.

3. A fuel injector assembly as defined in claim 1 for use in an engine containing an injector receiving recess having a supply port opening into the recess for supplying fuel to the injector and having a drain port opening into the recess for receiving the excess supplied through the supply port beyond the amount injected into the combustion chamber, in which
   (a) said injector body is shaped to be inserted into the recess to form the supply flow path between the supply port and the exterior surface of said injector body and to form a drain flow path, isolated from the supply flow path, extending between the drain port and the exterior surface of said injector body, and
   (b) said supply connecting means is shaped to cause the supply passage to extend from the exterior surface of said injector body to the interior surface of the central bore along a straight radial path perpendicular to the longitudinal axis of said injector body.

4. A fuel injector assembly as defined in claim 3, further including drain connecting means for providing a pathway for fuel to flow from the central bore into the drain flow path, and in which said injector plunger includes a flow control means for forming a scavenge flow path to cause scavenge flow of fuel through said injector body whenever said injector plunger is less than a first predetermined axial distance from the innermost position and for allowing fuel to be metered into the injection chamber from the supply passage whenever said injector plunger is moved more than a second predetermined axial distance from the innermost position.

5. A fuel injector assembly as defined in claim 4, in which said flow control means includes an annular groove on the exterior surface of said injector plunger for forming the scavenge flow path from the supply passage to the drain passage whenever said injector plunger is in the innermost position and a cylindrical land positioned inwardly from the annular groove to form a seal between the scavenge flow path and the injection chamber, said cylindrical land forming a portion of said exterior cylindrical surface of said injector plunger.

6. A fuel injector assembly as defined in claim 4 or 5, in which said drain connecting means includes a drain passage extending from the exterior surface of said injector body to the interior surface of the central bore along a straight radial path perpendicular to the longitudinal axis of said injector body.

7. A fuel injector assembly as defined in claim 5, in which the shape of the feed orifice is chosen to cause the amount of fuel metered into the injection chamber during each injection cycle to be dependent on both the pressure of the fuel supplied through the supply port and the total time during which said injector plunger is more than the first predetermined axial distance from its innermost position.

8. A fuel injector assembly as defined in claim 5, in which the first predetermined distance is less than the second predetermined distance by an amount equal to the axial extent of said cylindrical land plus the axial extent of the opening of the feed orifice into the central bore.

9. A fuel injector assembly defined in claim 3, in which said injector body contains on its exterior surface first and second annular recesses axially spaced along said injector body to communicate with the supply port and the drain port, respectively when said injector body is operatively positioned within the injector receiving recess.

10. A fuel injector assembly as defined in claim 9, in which including seal means for forming circumferential seals between the exterior of said injector body and the interior surface of the injector receiving recess to isolate the supply flow path from the drain flow path.

11. A fuel injector assembly as defined in claim 2, in which said third sector has a circumferential extent which causes it to hold said injector plunger in the supply passage blocking position from approximately the midpoint of the compression stroke of the corresponding piston to the commencement of injection.

* * * * *